United States Patent [19]

Ort

[11] Patent Number: 4,612,360

[45] Date of Patent: Sep. 16, 1986

[54] MELT POLYMERIZATION PROCESS FOR PREPARING POLYARYLATES

[75] Inventor: Morris R. Ort, Wilbraham, Mass.

[73] Assignee: Monsanto Company, St. Louis, Mo.

[21] Appl. No.: 786,785

[22] Filed: Oct. 11, 1985

[51] Int. Cl.$^4$ .............................................. C08G 63/30
[52] U.S. Cl. ................................... 528/182; 502/123; 528/173; 528/176; 528/190; 528/271
[58] Field of Search ............... 528/182, 271, 176, 190, 528/173; 502/123

[56] References Cited

U.S. PATENT DOCUMENTS

| | | | |
|---|---|---|---|
| 3,549,692 | 12/1970 | Bockmann et al. | 260/475 |
| 3,772,405 | 11/1973 | Hamb | 528/195 |
| 3,824,213 | 7/1974 | Stackman | 528/176 |
| 3,948,856 | 4/1976 | Stackman | 528/173 |
| 4,075,173 | 2/1978 | Maruyama et al. | 528/113 |
| 4,101,517 | 7/1978 | Ort | 528/271 |
| 4,102,864 | 7/1978 | Deex et al. | 528/193 |
| 4,127,560 | 11/1978 | Kramer | 528/273 |
| 4,321,355 | 3/1982 | Maresca et al. | 528/176 |
| 4,379,895 | 4/1983 | Frerking, Jr. et al. | 525/437 |

*Primary Examiner*—Lester L. Lee
*Attorney, Agent, or Firm*—Nancy J. Linck; R. Bruce Blance; William J. Farrington

[57] ABSTRACT

Melt preparation of polyarylate with catalyst system comprising an imidazole.

23 Claims, No Drawings

MELT POLYMERIZATION PROCESS FOR PREPARING POLYARYLATES

BACKGROUND OF THE INVENTION

This invention relates to a melt polymerization process for preparing a polyarylate wherein a diester of a dihydric phenol is condensed with an aromatic dicarboxylic acid in the presence of a catalytically effective amount of a catalyst comprising an imidazole and, optionally, as a co-catalyst, an alkali or alkaline earth metal salt of an acid of pKa>3. Such a process allows the condensation of proceed at a lower initial temperature and has a faster melt polymerization reaction rate when compared to similar processes which do not employ such a catalyst or catalyst system; and the polyarylate so produced has improved color.

Polyarylates have many superior properties which make them useful as engineering thermoplastics, including good mechanical properties, high heat distortion temperature, good fire retardancy, and good solvent resistance. They also have good processability which allows them to be molded into articles.

Many processes have been described in the literature for the preparation of polyarylates. One such process is the diacetate process. In the diacetate process a dihydric phenol is converted to the diester derivative by reacting it with an acid anhydride and then the diester derivative is reacted with an aromatic dicarboxylic acid(s) to form the polyarylate. For example, when the reaction product of bisphenol A and terephthalic acid is prepared by the diacetate process using acetic anhydride, the following reaction sequence takes place:

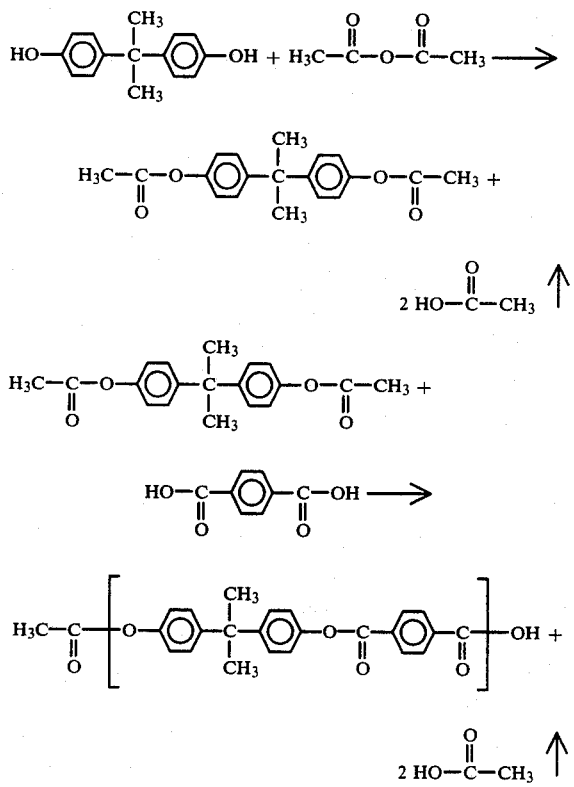

The condensation of the diester with the diacid according to the invention is accomplished by melt polymerization, thereby avoiding the use of costly solvents, minimizing environmental pollution, and reducing reactor volume. In such a polymerization process, however, long reaction times at relatively high temperatures, especially when terephthalic acid is one of the reactants, results in degradation of the reaction mixture components thereby generating an undesirable color, varying from dark yellow to brown, in the polymer product.

It has now been found that reaction times can be shortened and the intensity of the color lessened by catalyzing the melt polymerization reaction with a catalyst system comprising an imidazole and, optionally, as a co-catalyst, an alkali or alkaline earth salt of an acid of pKa>3. Although the mechanism of the catalytic action of the imidazole is not completely understood, it is believed that, when terephthalic acid is present, its function is two-fold, aiding in the dissolution of the very insoluble terephthalic acid by forming a more soluble salt, and acting as a conventional catalyst.

The acid anhydride suitable for use herein is derived from a monocarboxylic acid containing from 1 to 7 carbon atoms. The preferred acid anhydride is acetic anhydride, which is commercially available and has a low reflux temperature.

Any suitable dihydric phenol or admixtures thereof may be used herein. The preferred dihydric phenols are resorcinol; hydroquinone; diphenol; dihydroxynaphthalene; bis(4-hydroxyphenyl)methane (BPF or bisphenol F); 1,1- and 1,2-bis(4-hydroxyphenyl)ethane (BPE or bisphenol E); bis(4-hydroxyphenyl)sulfide; 2,2-bis(4-hydroxyphenyl)propane (BPA or bisphenol A); bis(4-hydroxyphenyl)oxide; and bis(4-hydroxyphenyl)sulfone. Among the especially preferred dihydric phenols are the bisphenols, BPF, BPE, and BPA. Contemplated as equivalents are substituted dihydric phenols, such as alkyl and halogen substituted derivatives, provided, however, that these substituents do not adversely affect the properties of the polymer or significantly diminish their ability to melt polymerize.

Any suitable aromatic dicarboxylic acid or admixtures thereof may be used herein. The preferred acids are terephthalic acid; isophthalic acid; bibenzoic acid; naphthalene dicarboxylic acid; bis(4-carboxyphenyl)methane; 1,2-bis(4-carboxyphenyl)ethane; 2,2-bis(4-carboxyphenyl)propane; bis(4-carboxyphenyl)oxide; bis(4-carboxyphenyl)sulfide; and bis(4-carboxyphenyl)sulfone. More preferred are terephthalic and isophthalic acid, and most preferred is terephthalic acid. Improvement in reaction rate is most notable when the acid comprises at least 50 mol percent terephthalic acid. Contemplated as equivalents are substituted aromatic dicarboxylic acids, such as alkyl and halogen substituted derivatives, provided, however, that these substituents do not adversely affect the properties of the polymer or significantly diminish their ability to melt polymerize.

Any suitable imidazole catalyst which yields an increase in melt polymerization reaction rate may be used herein. Normally such imidazoles will have a pKa>5. Based on improved reaction rate, the preferred imidazole catalysts are imidazole, 1-methylimidazole, 1-ethylimidazole, 2-ethyl-4-methyl imidazole, and benzimidazole. Especially preferred are imidazole and 1-methylimidazole, and most preferred, based on a combination of improved reaction rate and less intense color in the product, is 1-methylimidazole.

Suitable co-catalysts are any alkali or alkaline earth metal salt of any acid of pKa>3. Based on less intense color in the product, the preferred alkali or alkaline earth metal salts of acids of pKa>3 are selected from the group consisting of sodium, potassium, or lithium acetates, carbonates, benzoates, formates, bicarbonates, phosphates and monohydrogen phosphates. Especially preferred are lithium, sodium and potassium carbonates, acetates, phosphates, and monohydrogen phosphates; and most preferred are potassium carbonate, acetate, and phosphate.

Formation of the diester by reaction of the dihydric phenol with the acid anhydride may be accomplished under conventional esterification conditions. This reaction may take place in the presence or absence of a solvent. Optionally, a conventional esterification catalyst may be added to the reaction mixture. When the diester is formed in the presence of a solvent, the product is isolated by conventional techniques prior to the melt polymerization process of this invention.

The preparation of the polyarylate from the diester and the aromatic dicarboxylic acid is carried out by a melt polymerization process. Typically, approximately equimolar amounts, mole ratio=0.95 to 1.05, diester and acid are charged to the reactor. An effective amount of an imidazole catalyst of pKa>5, advantageously in the range of $1\times10^{-3}$ mole to about $3\times10^{-2}$ moles, preferably, between $3\times10^{-3}$ and $2\times10^{-2}$ moles, per mole of diester and, optionally, an effective amount of an alkali or alkaline earth metal salt of an acid of pKa>3, advantageously in the range of about $2\times10^{-6}$ mole to about $5\times10^{-3}$ mole per mole of diester, preferably between $5\times10^{-6}$ and $4\times10^{-3}$ mole, are also charged. The reaction mixture is then heated and, as the mixture is heated, the monocarboxylic acid of anhydride, which forms is removed advantageously at a temperature in the range of about 230° C. to about 300° C. A vacuum is normally applied (final pressure ~0.2–5 Torr) to facilitate removal of essentially all the monocarboxylic acid.

Formation of the diester and the polyarylate may be accomplished in separate reaction vessels. In such a case, the acid formed and the excess acid anhydride from the diester reaction in the first reactor may be removed by known techniques such as vacuum distillation or by chemical reaction. The diester is then reacted in the second reactor with the aromatic dicarboxylic acid in the presence of the imidazole catalyst or a catalyst system additionally comprising, as a co-catalyst, an alkali or alkaline earth metal salt of an acid of pKa>3 to form the polyarylate by melt polymerization.

Alternatively, both reactions may be performed in one reactor by first forming the diester at a temperature between 90° C. and 140° C., then removing the acid and excess acid anhydride as before, and finally forming the polyarylate at a temperature between 230° C. and 300° C. Thus all the reactants may be included in the initial reaction mixture and the reaction steps are controlled by the temperature.

Formation of the diester is advantageously carried out at a temperature sufficient to maintain reflux, usually between 130° and 140° C. when acetic anhydride is the esterification agent, and usually requires between 0.5 and 1.5 hours. Generally, the acid anhydride is used in excess, advantageously in the range of about 5 to 20 mole % excess. Formation of the polyarylate is effected at a temperature which maintains the reaction mixture in a molten state, advantageously in the range of 230 and 325° C., and preferably between 240° C. and 290° C. This reaction is preferably carried out in an inert atmosphere and at a reduced pressure, preferably less than 5 Torr., to facilitate removal of the monocarboxylic acid reaction product and drive the polycondensation to completion.

The process may be used to form a polyarylate with an inherent viscosity between 0.1 and 2.0 dl/g, preferably between 0.5 and 1.0 dl/g. The inherent viscosity is determined at 25° C. in a 60/40 weight mixture of phenol and sym-tetrachloroethane at a concentration of 0.5 gram per deciliter.

The melt polymerization process may be accomplished batchwise or continuously and by using any apparatus known in the art.

Stabilizers, colorants, processing aids, fillers and pigments may be added to the reaction mixture(s) provided that they do not react with it or with the products.

The invention is further illustrated but not limited by the following examples in which parts and percentages are by weight unless specified otherwise.

EXAMPLE 1

Example 1 demonstrates the increase in melt polymerization rate achieved by adding an imidazole catalyst to the melt condensation of BPA diacetate with terephthalic acid followed by isophthalic acid. A 1-l SS autoclave was charged with 312.4 g (1.0 mole) of bisphenol A diacetate, 88 g (0.5 mole) of terephthalic acid and 0.69 g ($5\times10^{-3}$ mole) of potassium carbonate. The mixture was heated until the bisphenol A diacetate was melted and the agitator was turned on. The mixture was heated to 256° C. without any evolution of acetic acid. The mixture was heated for an additional 30 minutes during which time the temperature increased to 260° C. No acetic acid was evolved indicating no polymerization was occurring. At this time 0.5 ml=0.53 g ($6\times10^{-3}$ mole) of 1-methylimidazole was injected into the autoclave. In seven minutes acetic acid evolution commenced and in 2 hours 52 ml=54.6 g (91% of theory) of acetic acid was collected. The reactor was cooled, opened and 88.6 g of isophthalic acid added. The reactor was sealed, heated and stirred. An additional 43 ml of acetic acid was collected at atmospheric pressure. Vacuum was applied and an additional 14 ml of acetic acid was collected. Total acetic acid was 113 ml=118.6 g (98.7% of theory). The inherent viscosity of the polymer was 0.20 dl/g when measured in 60/40 W/W phenol/sym-tetrachloroethane at a concentration of 0.5 g polymer/100 ml solvent.

EXAMPLES 2, 3, AND 4

Examples 2, 3, and 4 demonstrate the improved product color obtained by using a dual catalyst system comprising an imidazole and, as a co-catalyst, an alkali or alkaline earth metal salt of an acid of pKa>3, in the melt condensation of BPA diacetate with mixtures of isophthalic and terephthalic acid.

Three more polymer samples were prepared as in Example 1 above from bisphenol A diacetate and various mixtures of isophthalic and terephthalic acid. The catalyst used in Example 2 was 1-methylimidazole and in Examples 3 and 4, 1-methylimidazole and potassium carbonate. Visual inspection yielded the following comparative results:

| Example | Catalyst | Ratio* | Product Color |
|---|---|---|---|
| 2 | 1-methylimidazole | 75/25 | light brown |
| 3 | 1-methylimidazole + K$_2$CO$_3$ | " | white |

| Example | Catalyst | Ratio* | Product Color |
|---|---|---|---|
| 4 | 1-methylimidazole + K$_2$CO$_3$ | 90/10 | white |

*Isophthalic Acid/Terephthalic Acid

EXAMPLE 5

Example 5 demonstrates both the improved reaction rate and product color achieved in the melt condensation of BPF diacetate with terephthalic acid using an imidazole catalyst and, as a co-catalyst, an alkali or alkaline earth metal salt of an acid of pKa>3.

A polymer sample was prepared from 0.10 mole bisphenol F, 0.22 mole acetic anhydride, and 0.10 mole terephthalic acid according to the procedure in Example 1 initially using $1.2 \times 10^{-3}$ mole sodium acetate as the catalyst. Again, no acetic acid evolved prior to the addition of an imidazole catalyst. Upon addition of $6 \times 10^{-3}$ mole 1-methylimidazole, the rate immediately increased, as was indicated by the evolution of acetic acid. Approximately 21.5 ml acid was collected. (Theoretical yield: 24.8 ml). The color of the polymer was light yellow.

EXAMPLE 6

Example 6 demonstrates the preparation of a polymer according to the process of the invention having an inherent viscosity between 0.5 and 1.0 dl/g.

A 1-l ss autoclave was charged with 192.9 g (0.9 mole of 1,1-bis(4-hydroxyphenyl)ethane, 150 g (0.9 mole) of terephthalic acid, 204 g (2.0 moles) of acetic anhydride, 0.82 g (0.01 mole) 1-methylimidazole and 0.69 ($5 \times 10^{-3}$ mole) potassium carbonate. The mixture was heated to 100° C. and the agitator turned on. The reactor temperature was slowly increased over a one hour period and at 139° C. the acetic acid from acetylation of the bisphenol began to distill. The acetic acid from the acetylation and the excess acetic anhydride were distilled from the reaction as the reactor temperature was slowly increased. When the temperature reached 247° C. the theoretical acetic acid from acetylation and the excess acetic anhydride had been collected. Over a 30 minute period the reactor temperature was increased to 275° C. and 58 ml (56% of theory) of acetic acid from polymerization was collected. Vacuum was then applied to the reactor. Over a 30 minute period the reactor temperature was increased to 291° C. and the vacuum reduced to about 2 Torr. The vacuum was released with nitrogen and 299 g of polymer was recovered from the reactor. 208 ml of acetic acid and excess acetic anhydride were collected (94% of theory) for acetylation and polymerization. The inherent viscosity of the polymer was 0.22 dl/g.

The polymer prepared in the preceding step was reduced to a small particle size in a Waring blender. The polymer was covered with acetone and allowed to crystallize overnight. The polymer was recovered by filtration and dried in a vacuum oven. The crystalline prepolymer was placed in 40 mm by 250 mm cylindrical glass tubes. The tubes were attached to a vacuum manifold at 0.05 to 0.07 Torr and heated in a fluidized sand bath at 280° C. After 2½ hours of solid state polymerization at 280° C., the inherent viscosity of the polymer was 0.72.

EXAMPLES 7 AND 8

Example 7 is not according to the invention but is included to demonstrate the increased reaction rate achieved in Example 8 when BPA diacetate is condensed with a 50/50 mixture of isophthalic and terephthalic acid in the presence of an imidazole catalyst.

A 100 ml round-bottom flask was charged with 31.2 g (0.10 mole) bisphenol A diacetate, 8.3 g (0.05 mole) isophthalic acid, 8.3 g (0.05 mole) terephthalic acid, and 0.247 g ($2.5 \times 10^{-3}$ mole) potassium acetate. The mixture was heated, with agitation, to the point where acetic acid began to distill (approximately 250° C.). In 2 hours, 2 minutes, 70% of the theoretical yield of acetic acid was distilled, indicating a conversion to product of approximately this amount. The color of the product was light yellow.

Example 8 demonstrates the increased reaction rate achieved when an imidazole is substituted for the catalyst of Example 7 in a melt condensation of BPA diacetate with a 50/50 mixture of isophthalic and terephthalic acid.

The procedure of Example 7 was repeated except that 0.206 g ($2.5 \times 10^{-3}$ mole) 1-methylimidazole was substituted for the potassium acetate. In 45 minutes, 70% of the theoretical yield of acetic acid was distilled, again indicating approximately 70% conversion. The color of the product was light yellow.

| Example | Catalyst | Ratio* | Time** (min.) | Product Color |
|---|---|---|---|---|
| 7 | KC$_2$H$_3$O$_2$ | 50/50 | 122 | light yellow |
| 8 | 1-methylimidazole | 50/50 | 45 | light yellow |

*Isophthalic Acid/Terephthalic Acid
**Approximately 70% conversion

I claim:

1. A melt polymerization process for preparing a polyarylate wherein a diester of a dihydric phenol is condensed with an aromatic dicarboxylic acid in the presence of a catalytically effective amount of a catalyst system comprising an imidazole of pKa>5.

2. The melt polymerization process of claim 1 wherein said aromatic dicarboxylic acid comprises terephthalic acid.

3. The melt polymerization process of claim 1 wherein said aromatic dicarboxylic acid comprises at least 50 mol percent terephthalic acid.

4. The melt polymerization process of claim 1, 2, or 3 wherein said imidazole is selected from the group consisting of imidazole, 1-methylimidazole, 1-ethylimidazole, 2-ethyl-4-methylimidazole, and benzimidazole.

5. The melt polymerization process of claim 1, 2, or 3 wherein said imidazole is selected from the group consisting of imidazole and 1-methylimidazole.

6. The melt polymerization process of claim 1, 2, or 3 wherein said imidazole is 1-methylimidazole.

7. The melt polymerization process of claim 1, 2, or 3 wherein said catalyst system additionally comprises, as a co-catalyst, an alkali or alkaline earth metal salt of an acid of pKa>3.

8. The melt polymerization process of claim 5 wherein said catalyst system additionally comprises, as a co-catalyst, an alkali or alkaline earth metal salt of an acid of pKa>3.

9. The melt polymerization process of claim 6 wherein said catalyst system additionally comprises, as a co-catalyst, an alkali or alkaline earth metal salt of an acid of pKa>3.

10. The melt polymerization process of claim 7 wherein said co-catalyst is selected from the group consisting of lithium, sodium, and potassium acetates; lithium, sodium, and potassium carbonates; and potassium phosphate.

11. The melt polymerization process of claim 8 wherein said co-catalyst is selected from the group consisting of lithium, sodium, and potassium acetates; lithium, sodium, and potassium carbonates; and potassium phosphate.

12. The melt polymerization process of claim 9 wherein said co-catalyst is selected from the group consisting of lithium, sodium, and potassium acetates; lithium, sodium, and potassium carbonates; and potassium phosphate.

13. The melt polymerization process of claim 7 wherein said co-catalyst is selected from the group consisting of potassium carbonate, potassium acetate, and potassium phosphate.

14. The melt polymerization process of claim 8 wherein said co-catalyst is selected from the group consisting of potassium carbonate, potassium acetate, and potassium phosphate.

15. The melt polymerization process of claim 9 wherein said co-catalyst is selected from the group consisting of potassium carbonate, potassium acetate, and potassium phosphate.

16. The melt polymerization process of claim 7 wherein said co-catalyst is potassium carbonate.

17. The melt polymerization process of claim 8 wherein said co-catalyst is potassium carbonate.

18. The melt polymerization process of claim 9 wherein said co-catalyst is potassium carbonate.

19. The melt polymerization process of claim 9 wherein said co-catalyst is potassium phosphate.

20. A melt polymerization process for preparing a polyarylate wherein 1.0 mole of a bisphenol diacetate is condensed with between 0.95 and 1.05 mole terephthalic acid at a temperature in the range of about 240° to about 300° C. in the presence of a catalyst comprising from about $1 \times 10^{-3}$ to about $3 \times 10^{-2}$ mole of an imidazole selected from the group consisting of imidazole and 1-methylimidazole and a co-catalyst comprising from about $2 \times 10^{-6}$ to about $3 \times 10^{-2}$ mole of an alkali metal salt of an acid selected from the group consisting of potassium carbonate, potassium acetate, sodium carbonate, sodium acetate, sodium phosphate, and potassium phosphate.

21. The melt polymerization process of claim 20 wherein said catalyst comprises from about $3 \times 10^{-3}$ to about $2 \times 10^{-2}$ mole 1-methylimidazole and said co-catalyst comprises from about $5 \times 10^{-6}$ to about $4 \times 10^{-3}$ mole of an alkali metal salt of an acid selected from the group consisting of potassium carbonate, potassium acetate, and potassium phosphate.

22. A reaction system for preparing a polyarylate, comprising: a diester of a dihydric phenol, an aromatic dicarboxylic acid, and a catalytically effective amount of a catalyst system comprising an imidazole of pka>5 and an alkali or alkaline earth metal salt of an acid of pKa>3.

23. The reaction system of claim 22, wherein said imidazole is 1-methylimidazole and wherein said alkali or alkaline earth metal salt is potassium carbonate.

* * * * *